United States Patent
Seo et al.

(10) Patent No.: US 11,121,377 B2
(45) Date of Patent: Sep. 14, 2021

(54) IONIC-ELECTRONIC CONDUCTIVE MATERIAL, METHOD OF MANUFACTURING SAME, AND LITHIUM-AIR BATTERY COMPRISING SAME

(71) Applicant: SAMSUNG ELECTRONICS CO., LTD., Suwon-si (KR)

(72) Inventors: Dong-Hwa Seo, Burlington, MA (US); Sang Bok Ma, Suwon-si (KR); Hyuk Jae Kwon, Suwon-si (KR); Hyunpyo Lee, Suwon-si (KR); Dongmin Im, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 53 days.

(21) Appl. No.: 16/217,595

(22) Filed: Dec. 12, 2018

(65) Prior Publication Data
US 2020/0194800 A1    Jun. 18, 2020

(51) Int. Cl.
*H01M 4/86*   (2006.01)
*H01M 12/02*  (2006.01)
*H01M 12/08*  (2006.01)
*H01M 4/90*   (2006.01)
*H01M 4/38*   (2006.01)

(52) U.S. Cl.
CPC ......... *H01M 4/8673* (2013.01); *H01M 12/02* (2013.01); *H01M 12/08* (2013.01); *H01M 2004/8689* (2013.01)

(58) Field of Classification Search
None
See application file for complete search history.

(56) References Cited

U.S. PATENT DOCUMENTS

| | | | | |
|---|---|---|---|---|
| 7,300,722 | B2 * | 11/2007 | Christian | H01M 4/485 429/218.1 |
| 9,742,005 | B2 | 8/2017 | Choi et al. | |
| 2006/0228629 | A1 * | 10/2006 | Christian | H01M 4/485 429/231.1 |
| 2011/0212382 | A1 | 9/2011 | Randall et al. | |
| 2012/0276459 | A1 | 11/2012 | Im et al. | |
| 2017/0173668 | A1 | 6/2017 | Wu et al. | |

(Continued)

FOREIGN PATENT DOCUMENTS

| | | | |
|---|---|---|---|
| JP | 07169456 A * | 7/1995 | |
| JP | 5226290 B2 | 7/2009 | |

(Continued)

OTHER PUBLICATIONS

G, Banerjee, et al. "Anomalous specific heat and other properties of amorphous Ba1—xLixBiO3—δ(x = 0-0.7) oxides around semiconductor-metal semiconductor like transition." Journal of Materials Science Letters, vol. 15, 1996, pp. 2008-2011. (Year: 1996).*

*Primary Examiner* — Ula C Ruddock
*Assistant Examiner* — Amanda Rosenbaum
(74) *Attorney, Agent, or Firm* — Cantor Colburn LLP

(57) ABSTRACT

An ionic-electronic conductive compound of Formula 1:

$$Li_xA_{(1-x-y)}M_zM'_{(1-z)}O_3 \qquad (1)$$

wherein, $0<x\leq0.5$, $0\leq y\leq0.5$, $0\leq z\leq0.5$, A comprises Mg, Ca, Sr, Ba, or a combination thereof, M and M' each independently comprise As, Sb, Bi, or a combination thereof.

17 Claims, 7 Drawing Sheets

(56) References Cited

U.S. PATENT DOCUMENTS

| | | | |
|---|---|---|---|
| 2018/0198133 A1 | 7/2018 | Im et al. | |
| 2020/0119346 A1* | 4/2020 | Ma | C01G 25/006 |
| 2020/0119391 A1* | 4/2020 | Ma | H01M 4/131 |

FOREIGN PATENT DOCUMENTS

| | | | |
|---|---|---|---|
| JP | 2009283381 A1 | | 12/2009 |
| JP | 2016213178 A | * | 12/2016 |
| JP | 2016213178 A | | 12/2016 |
| KR | 20150104674 A | | 9/2015 |
| KR | 20160123162 A | | 10/2016 |

\* cited by examiner

IONIC-ELECTRONIC CONDUCTIVE MATERIAL, METHOD OF MANUFACTURING SAME, AND LITHIUM-AIR BATTERY COMPRISING SAME

BACKGROUND

Field of the Invention

The present disclosure relates to a material having both ionic and electronic conductivity, a method of manufacturing same, and lithium-air battery comprising same.

Description of the Related Art

A lithium-air battery includes a lithium metal negative electrode and a positive electrode that uses oxygen from the air as an active material. A reduction/oxidation reaction of oxygen occurs at the positive electrode, and an oxidation/reduction reaction of a lithium occurs at the negative electrode. The lithium-air battery converts chemical energy generated by the oxidation/reduction reaction into electrical energy and outputs the electrical energy. For example, the lithium-air battery absorbs oxygen during discharge and emits oxygen during charge. Since the lithium-air battery uses oxygen from the air, an energy density of the lithium-air battery may be several times greater than an energy density of a lithium ion battery.

A capacity or performance of the lithium-air battery may be influenced by the material and configuration of the positive (air) electrode. A perovskite-type material has been used as a solid electrolyte for a lithium-ion battery or an all solid-state battery. However, the electronic conductivity of the perovskite material is very low, e.g., less than $10^{-8}$ S/cm or less, making the use of such a material difficult in a lithium-air battery.

Thus there remains a need for an improved positive electrode material having improved ionic and electronic conductivity, and a metal air battery including the same.

SUMMARY

Disclosed is an ionic-electronic conductor compound of Formula 1:

(1)

wherein $0<x\leq0.5$, $0\leq y\leq0.5$, $0\leq z\leq0.5$, A includes Mg, Ca, Sr, Ba, or a combination thereof, and M and M' each independently comprise As, Sb, Bi, or a combination thereof.

Also disclosed a positive electrode for a lithium-air battery, the positive electrode including the ionic-electronic conductive compound.

Also disclosed is lithium-air battery including: a negative electrode; a separator; and the positive electrode.

Also disclosed is a method of manufacturing the ionic-electronic conductor, the method including: contacting a compound including Li, a compound including Mg, Ca, Sr, Ba, or a combination thereof, and a compound comprising As, Sb, Bi, or a combination thereof to form a mixture; and heat-treating the mixture to form the ionic-electronic conductive compound.

The above described and other features are exemplified by the following figures and detailed description.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

For a lithium-air battery, a mixed ionic-electronic conductor desirably has both high ionic and high electronic conductivity as well as chemical stability against air and moisture. A perovskite material such as a Li—La—Ti—$O_3$, has been used as a solid electrolyte for a lithium-ion battery or an all solid-state battery, however, the electronic conductivity of the perovskite material is very low, e.g., less than $10^{-8}$ S/cm or less, limiting the rate capability of a battery comprising Li—La—Ti—$O_3$.

Disclosed is a compound having both suitable ionic conductivity and suitable electronic conductivity, and which may be used as a positive electrode material in a lithium-air battery. The compound, also referred to herein as an ionic-electronic conductive compound, is a lithium metal oxide material having a perovskite-type structure. The compound has improved stability in the presence of air and moisture, suitable lithium ion conductivity, and suitable electronic conductivity.

The ionic-electronic conductive compound can be represented by Formula 1:

$$\text{Li}_x A_{(1-x-y)} M_z M'_{(1-z)} O_3 \quad (1)$$

wherein, $0<x\leq0.5$, $0\leq y\leq0.5$, $0\leq z\leq0.5$, A comprises Mg, Ca, Sr, Ba, or a combination thereof, M and M' each independently comprise As, Sb, Bi, or a combination thereof.

In an embodiment, in Formula 1, $0<x\leq0.5$, $0<x\leq0.5$, $0<x\leq0.25$, $0<x<0.25$, $0.1\leq x\leq0.5$, $0.1<x\leq0.5$, $0.1<x<0.5$, $0.1\leq x\leq0.25$, $0.1<x\leq0.25$, $0.1<x<0.25$, $0.1\leq x\leq0.20$, $0.1<x\leq0.20$, or $0.1<x<0.20$.

In an embodiment, in Formula 1, $0\leq y\leq0.5$, $0<y\leq0.5$, $0<y<0.5$, $0\leq y\leq0.25$, $0<y\leq0.25$, $0<y<0.25$, $0.1\leq y\leq0.5$, $0.1<y\leq0.5$, $0.1<y<0.5$, $0.1\leq y\leq0.25$, $0.1<y\leq0.25$, $0.1<y<0.25$, $0.1\leq y\leq0.20$, or $0.1<y\leq0.20$. In Formula 1, y may represent a vacancy content.

The vacancy content may be included explicitly in Formula 1 to provide Formula 1A:

$$\text{Li}_x A_{(1-x-y)} V_y M_z M'_{(1-z)} O_3 \quad (1)$$

wherein A, M, M', x, and y are as provided above, and V represents a vacancy.

An embodiment in which A is Ba, M' is Bi, and $0.1\leq x\leq0.25$, and y is 0.2 is mentioned.

Figure 1:
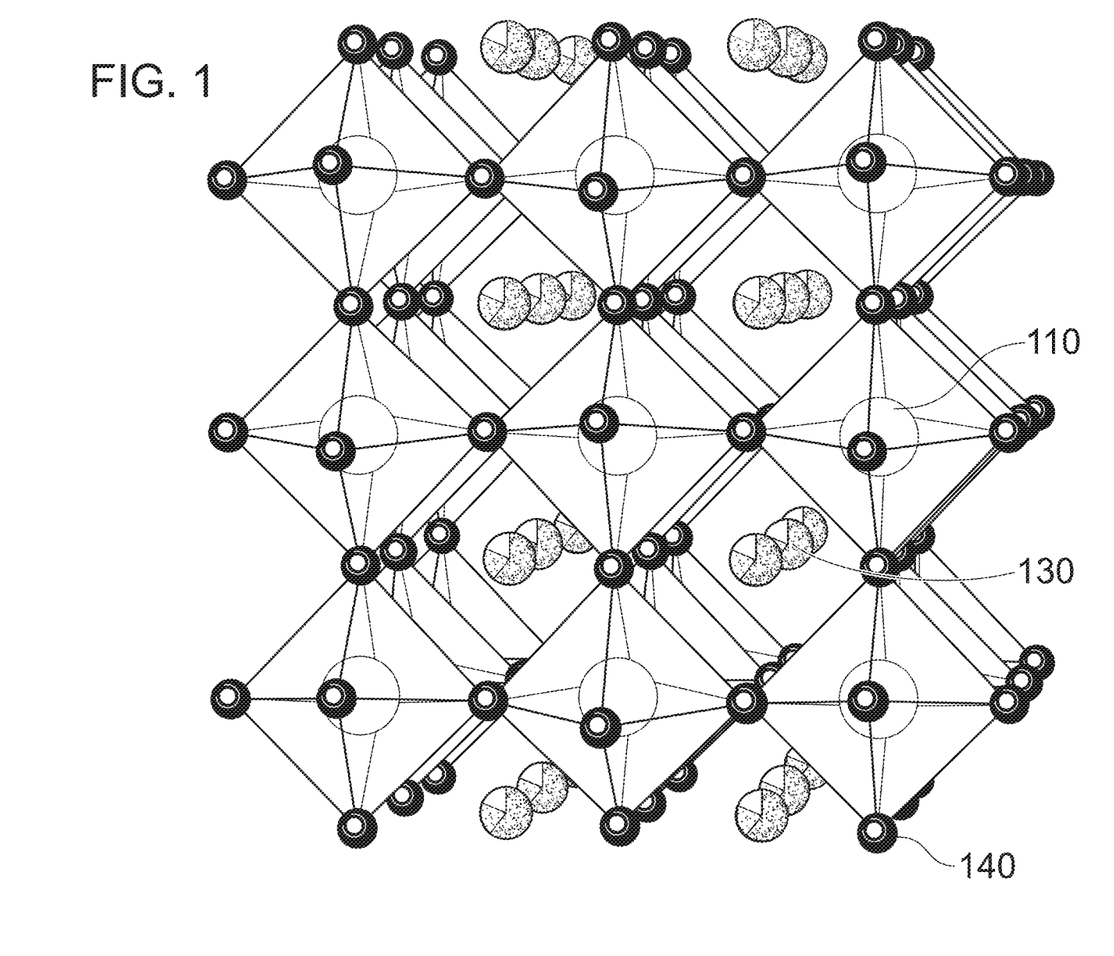
FIG. 1 is a schematic view of an embodiment of a perovskite-type structure.

As shown in FIG. 1, the ionic-electronic conductor compound has a perovskite-type structure. In the perovskite-type structure, a first metal site 110 is coordinated by six oxygen atoms 140 to form $MO_6$ or $M'O_6$ octahedra. The first metal site 110 is occupied by M or M' of Formula 1. The metal M or M' has a formal valence of 3+ or 5+. A second metal site 130 is between the $MO_6$ or $M'O_6$ octahedra. The second metal site 130 is occupied by A or lithium of Formula 1. A has a formal valence of 2+.

The ionic-electronic conductive compound may have an average particle size of 1 nanometer (nm) to 1,000 nm. Accordingly, the ionic-electronic conductive compound may be used to form a nanoporous positive electrode. For example, the ionic-electronic conductor compound may have an average particle size of 1 nm to 750 nm, or 1 nm to 500 nm, or 5 nm to 500 nm, or 10 nm to 200 nm, or 10 nm to 100 nm. As used herein, the "average particle size" refers to a particle diameter in the case of spherical particles, or a longest dimension in the case of non-spherical particles, corresponding to 50% of the particles in a distribution curve in which particles are accumulated in the order of particle size from the smallest particle to the largest particle, and a total number of the accumulated particles is 100%. Average particle size may be determined using a particle size analyzer, a transmission electron microscope (TEM) image, or a scanning electron microscope (SEM) image. As an example of another method, average particle size may be measured by dynamic light-scattering, and counting the number of particles within a predetermined size range, performing data analysis, and calculating an average particle diameter.

The ionic-electronic conductive compound has an electronic conductivity of greater than $1\times10^{-9}$ Siemens per centimeter (S/cm), or greater than or equal to $8\times10^{-8}$ S/cm, or greater than or equal to $5\times10^{-8}$ S/cm, or greater than or equal to $1\times10^{-8}$ S/cm, or greater than or equal to $5\times10^{-7}$ S/cm, or greater than or equal to $1\times10^{-7}$ S/cm, or greater than or equal to $5\times10^{-6}$ S/cm, or greater than or equal to $2\times10^{-6}$ S/cm, or greater than or equal to $1\times10^{-6}$ S/cm, or greater than or equal to $5\times10^{-5}$ S/cm, or greater than or equal to $2\times10^{-5}$ S/cm, as measured at a temperature of 20° C. The compound of Formula 1 has an electronic conductivity of $1\times10^{-9}$ S/cm to $5\times10^{-4}$ S/cm, or $8\times10^{-8}$ S/cm to $1\times10^{-5}$ S/cm, or $2\times10^{-8}$ S/cm to $2\times10^{-6}$ S/cm, when measured at 20° C.

The ionic-electronic conductive compound has an ionic conductivity of greater than or equal to $8\times10^{-8}$ S/cm, or greater than or equal to $5\times10^{-8}$ S/cm, or greater than or equal to $1\times10^{-8}$ S/cm, or greater than or equal to $5\times10^{-7}$ S/cm, or greater than or equal to $1\times10^{-7}$ S/cm, or greater than or equal to $5\times10^{-6}$ S/cm, or greater than or equal to $2\times10^{-6}$ S/cm, or greater than or equal to $1\times10^{-6}$ S/cm, or greater than or equal to $5\times10^{-5}$ S/cm, or greater than or equal to $2\times10^{-5}$ S/cm, as measured at a temperature of 20° C. The compound of Formula 1 has an electronic conductivity of $5\times10^{-8}$ S/cm to $1\times10^{-4}$ S/cm, or $1\times10^{-8}$ S/cm to $5\times10^{-5}$ S/cm, or $5\times10^{-7}$ S/cm to $1\times10^{-5}$ S/cm, when measured at 20° C. In an embodiment, the ionic-electronic conductive compound has an ionic conductivity of greater than $5\times10^{-8}$ Siemens per centimeter at 20° C.

In an embodiment, the ionic-electronic conductive compound has an electronic conductivity of $2\times10^{-8}$ to $2\times10^{-6}$ Siemens per centimeter at 20° C., and an ionic conductivity of $3\times10^{-8}$ to $3\times10^{-6}$ Siemens per centimeter at 20° C.

A method of manufacturing an ionic-electronic conductive compound includes contacting a compound comprising Li, a compound including Mg, Ca, Sr, Ba, or a combination thereof, and a compound comprising As, Sb, Bi, or a combination thereof to form a mixture, and heat-treating the mixture to form the compound of Formula 1:

$$Li_xA_{(1-x-y)}M_zM'_{(1-z)}O_3$$

wherein $0<x\leq 0.5$, $0\leq y\leq 0.5$, $0\leq z\leq 0.5$, A comprises Mg, Ca, Sr, Ba, or a combination thereof, and M and M' each independently comprise As, Sb, Bi, or a combination thereof.

The starting materials, e.g., the compound comprising Li, the compound comprising Mg, Ca, Sr, Ba, or a combination thereof, and the compound comprising As, Sb, Bi, or a combination thereof, are combined together, e.g., by ball-milling, or mixing in a planetary mixer, to form a mixture. The mixture is then pressed into a pellet and heat-treated to form the ionic-electronic conductive compound.

The heat-treating may comprise heat-treating at a temperature of less than 850° C., less than or equal to 800° C., or less than or equal to 750° C., or less than or equal to 700° C., and may be for a period of 5 hours to 25 hours, or for a period of 7 hours to 20 hours, or a period of 10 hours to 15 hours. For example, the heat-treating of the mixture may be performed at a temperature in a range of 600° C. to 800° C., or 650° C. to 800° C., or 650° C. to 750° C., for 5 hours to 20 hours. The heat-treatment may be performed in the air, but embodiments are not limited thereto, and the heat-treatment may be performed in an oxidizing atmosphere.

The heat-treating may include a calcination step following by a sintering step. The calcination step may comprise heat-treating at 600° C. to 800° C., or 650° C. to 800° C., or 650° C. to 750° C., for 5 hours to 20 hours, and the sintering step may be performed at 500° C. to 750° C., or 550° C. to 700° C., or 550° C. to 650° C., for a time period of 5 hours to 20 hours. In an embodiment, the heat-treating includes calcining at 650° C. to 750° C. and sintering at 600° C. to 800° C. to form the ionic-electronic conductive compound of Formula 1.

The ionic-electronic conductive compound may be used in a positive electrode of a lithium-air battery.

Figure 2:
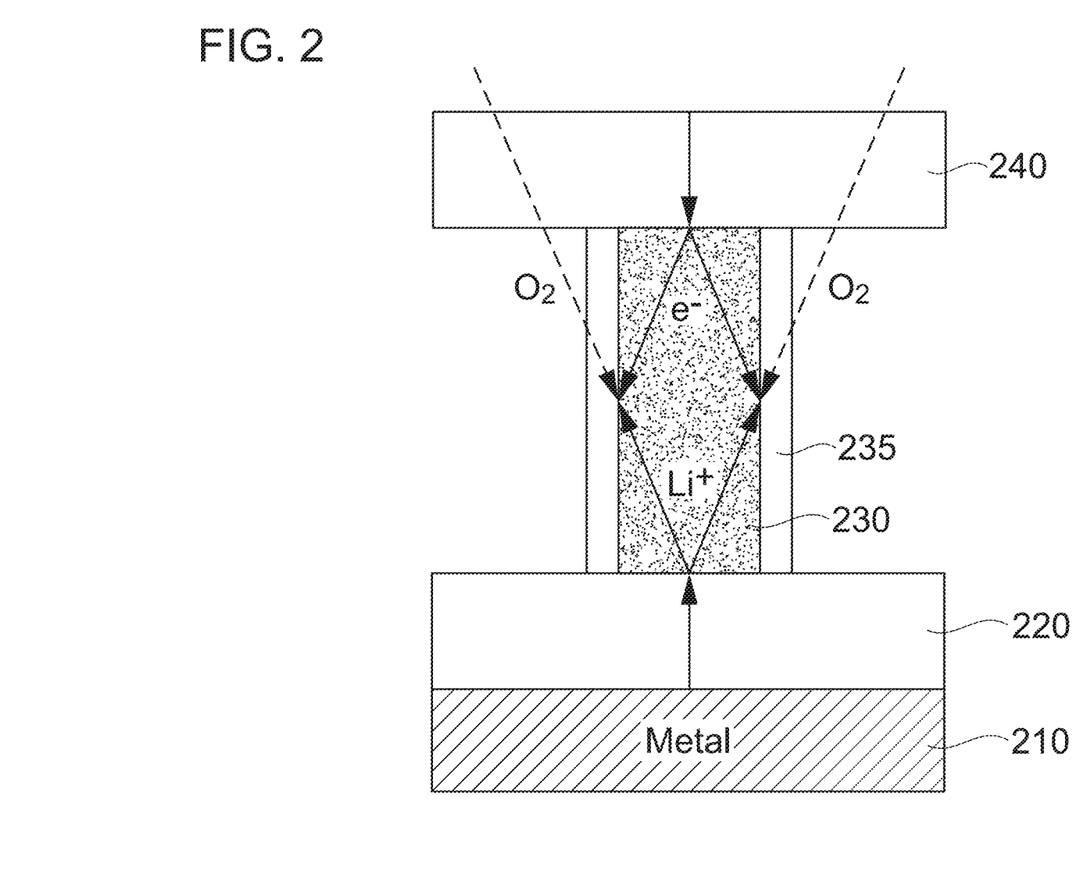
FIG. 2 is a cross-sectional view of an embodiment of a lithium-air battery.

FIG. 2 is a schematic cross-sectional view of an embodiment of a lithium-air battery. Referring to FIG. 2, the lithium-air battery includes a negative electrode 210 including a metal, and a positive electrode 230 spaced apart from the negative electrode 210. The positive electrode 230 may include an ionic-electronic conductor compound capable of conducting both electrons and ions. The ionic-electronic conductor compound may be the compound of Formula 1, described in detail above. A separator 220 may be disposed between the negative electrode 210 and the positive electrode 230. The lithium-air battery may further include a gas diffusion layer 240 contacting at least one surface of the positive electrode 230. The gas diffusion layer 240 may facilitate supply of oxygen ($O_2$) to the positive electrode 230. The positive electrode 230 and the gas diffusion layer 240 may be in a form of a single positive electrode assembly. In an embodiment, the positive electrode assembly of the lithium-air battery may include the positive electrode 230 and optionally may further include the gas diffusion layer 240.

The negative electrode 210 may comprise lithium, a lithium alloy, or a combination thereof. When the negative electrode 210 includes lithium, a lithium-air battery is provided.

The positive electrode 230 may be an air electrode configured for using oxygen ($O_2$) from air as positive electrode active material. As described above, the positive electrode 230 may include the ionic-electronic conductive compound capable of conducting both electrons and ions. The ionic-electronic conductive compound may provide a path for metal ion transfer and a path for electron transfer such that metal ions supplied from the negative electrode 210 and a gas (e.g., oxygen) supplied from the positive electrode 230 electrochemically react with each other. In other words, the ionic-electronic conductive compound may function both as a positive electrode providing a path for electron transfer and as an electrolyte providing a path for ion transfer. The ionic-electronic conductive compound may be a solid inorganic perovskite-type compound having the structure of Formula 1, described above. The positive electrode 230 may be an electrode not including an organic electrolyte, in other words, may be an organic-electrolyte-free electrode. In an embodiment, the ionic-electronic conductive compound consists essentially of, or consists of, the solid inorganic perovskite compound. In an embodiment the ionic-electronic conductive compound consists of the solid inorganic perovskite compound. In addition, the positive electrode 230 may be an electrode not including a liquid electrolyte, that is, the positive electrode may be a liquid-electrolyte-free electrode.

In the disclosed lithium-air battery, the following electrochemical reaction may occur during discharge.

$$2Li^+ + O_2 + 2e^- \rightarrow Li_2O_2(solid)$$

Lithium ions ($Li^+$) supplied from the negative electrode 210 and oxygen ($O_2$) supplied from air may combine (react) with electrons ($e^-$) on a surface of the positive electrode 230 to generate a solid, which, while not wanting to be bound by theory, is understood to comprise $Li_2O_2$. In this case, the ionic-electronic conductor compound of the positive electrode 230 may provide both path for a lithium ion ($Li^+$) transfer and a path for electron transfer. The generated product, e.g., $Li_2O_2$, is a reaction product 235. During charge, the discharging reaction may be reversed to convert the $Li_2O_2$ to $O_2$ and $Li^+$.

The separator 220, if present, may be disposed between the negative electrode 210 and the positive electrode 230. The separator 220 may be a non-woven polymeric material, such as a microporous polyethylene material, a microporous polypropylene material, a combination thereof, e.g., a polypropylene/polyethylene/polypropylene film, a polyphenylene sulfide material, or a combination thereof.

The pores of the separator may comprise an ion-conductive material, i.e., an electrolyte. The electrolyte may be a solid electrolyte. However, specific materials of the solid electrolyte are a mere example, and any suitable solid material may be used. The solid electrolyte may be in a solid state and may comprise a polymer electrolyte, an inorganic electrolyte, a composite electrolyte, e.g., an electrolyte obtained by mixing the polymer electrolyte and the inorganic-based electrolyte, or a combination thereof.

The anode layer 210 may comprise lithium, a lithium alloy, or a combination thereof.

The gas diffusion layer 240 may function to absorb oxygen from the air and supply the absorbed oxygen to the positive electrode 230. To this end, the gas diffusion layer 240 may have a porous structure. For example, the gas diffusion layer 240 may comprise a carbon paper including a carbon fiber, carbon cloth, carbon felt, a porous metal foam, a metal fabric mat, or a combination thereof. In addition, the gas diffusion layer 240 may comprise a flexible porous material such as a non-woven fabric, e.g., a non-conductive non-woven fabric.

Alternatively, the positive electrode 230 may comprise a porous structure so as to function as a gas diffusion layer. In this case, the gas diffusion layer 240 may be omitted.

The lithium-air battery may further include a negative electrode current collector (not illustrated) contacting the negative electrode 210. The negative electrode current collector may be disposed on a lower surface of the negative electrode 210. Therefore, the negative electrode 210 may be disposed between the negative electrode current collector and the separator 220. The negative electrode current collector may include any suitable conductor, for example, copper or stainless steel (SUS). In addition, the lithium-air battery may further include a positive electrode current collector contacting the gas diffusion layer 240. The positive electrode current collector may be disposed on an upper surface of the gas diffusion layer 240. Therefore, the gas diffusion layer 240 may be disposed between the positive electrode current collector and the positive electrode 230. The positive electrode current collector may comprise any suitable conductor, for example, stainless steel (SUS). In this case, the SUS of the positive electrode collector layer may have a mesh structure for transmitting air or another oxygen containing gas. A material of the positive electrode current collector is not limited to the SUS, and can comprise aluminum, for example. The material of the positive electrode current collector may be a combination of conductors. When the gas diffusion layer 240 is omitted the positive electrode current collector may contact the positive electrode 230. The negative electrode current collector may be a part of a negative electrode portion of the lithium-air battery, and the positive electrode current collector may be a part of the positive electrode portion of the lithium-air battery.

A lithium-air battery may include a negative electrode, a separator, and the above-described positive electrode including the ionic-electronic conductive compound. The lithium-air battery may be a liquid-electrolyte-free battery, i.e., not including a liquid electrolyte. In addition, the lithium-air battery may be an organic-electrolyte-free battery, i.e., not including an organic electrolyte, or a liquid-electrolyte-free battery. In this regard, the lithium-air battery may have various features and functions.

Figure 3:
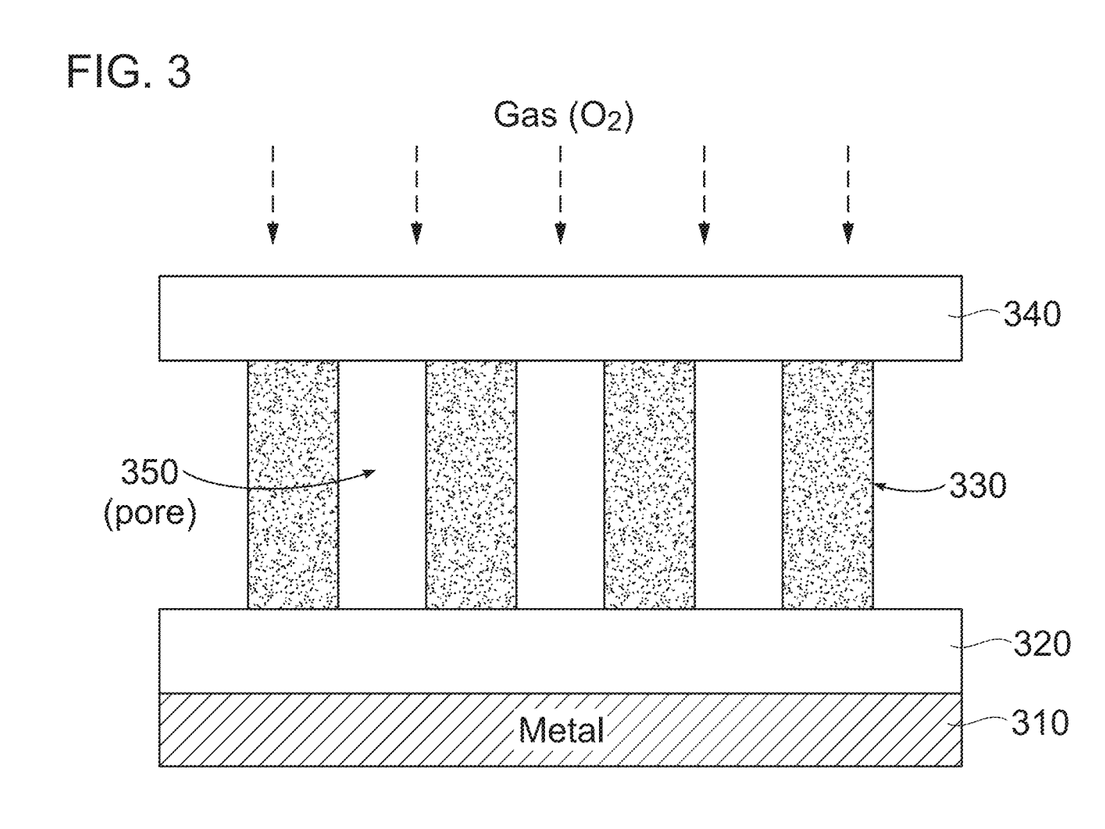
FIG. 3 is a cross-sectional view of another embodiment of a lithium-air battery.

FIG. 3 is a cross-sectional view of an embodiment of a lithium-air battery. Referring to FIG. 3, the lithium-air battery includes a positive electrode 330, a negative electrode 310, and a separator 320 between the negative electrode 310 and the positive electrode 330 and further includes a gas diffusion layer 340 contacting the positive electrode 330. The positive electrode 330 may include a space 350 (e.g., a pore). A reaction product generated by an electrochemical reaction is disposed in the space 350. Therefore, the positive electrode 330 may be considered a "pore-containing layer" including a space 350 (e.g., a pore or void). The positive electrode 330 may include a plurality of pores disposed in a regular or irregular manner. In an embodiment, the plurality of pores may be electrolyte-free regions never including an electrolyte. In another embodiment, a portion of the plurality of pores may include an electrolyte. In an embodiment, since the positive electrode 330 includes an ionic-electronic conductor compound capable of conducting both electrons and ions, an ion-conductive electrolyte may be nonexistent around the positive electrode 330 and in the plurality of pores of the positive electrode 330, or alternatively, may be provided in only a portion of the plurality of pores as desired. The plurality of pores of the positive electrode 330 provide a channel for a gas (e.g., oxygen) transfer. When all of the plurality of pores are never filled with an electrolyte and remain empty or only a portion of the plurality of pores are filled with an electrolyte, improved gas (e.g., oxygen) transport may be provided. The size and configuration of the pores in the positive electrode 330 are not limited to those shown in FIG. 3, and can be modified as desired.

The positive electrode 330 may have, for example, a porosity of greater than 0 volume percent (vol %), or greater than or equal to 10 vol %, or greater than or equal to 20 vol %, or greater than or equal to 50 vol %, or greater than or equal to 75 vol %, or greater than or equal to 80 vol %, based on a total volume of the positive electrode. The positive electrode 330 may have a porosity of less than or equal to 90 vol %. The porosity may be in a range of 0 vol % to 90 vol %, or in a range of 30 vol % to 90 vol %, or 40 vol % to 80 vol %, based on a total volume of the positive electrode. Because the reaction area of the lithium-air battery is increased as a specific surface area of the positive electrode is increased, a capacity and an energy density of the lithium-air battery may be improved. The positive electrode may have a specific surface area of 100 $m^2/g$ or greater, for example, 150 $m^2/g$ or greater, or 250 $m^2/g$ or greater.

In a lithium-air battery including an electrolyte (e.g., organic electrolyte) impregnated in pores of a porous positive electrode, the porous positive electrode acts as an electronic conductor while the electrolyte acts as an ionic conductor such that electrons are transferred through the porous positive electrode and lithium ions are transferred through the electrolyte. The oxygen and lithium ions may react with the electrons in the pores of the porous positive electrode to generate a lithium oxide, e.g., lithium peroxide, on a carbon surface of the porous positive electrode. The thus-produced lithium peroxide ($Li_2O_2$) has high reactivity, as does the intermediate product, singlet oxygen ($O_2^-$), and the lithium peroxide and the singlet oxygen can chemically decompose the organic electrolyte, causing rapid deterioration in the lithium-air battery. That is, and while not wanting to be bound by theory, it is understood that a chemical deterioration in the positive electrode of the lithium-air battery is caused by the interaction between the reaction product, the intermediate product, and the organic electrolyte. The chemical deterioration may result in a reduction in the performance of the lithium-air battery and a decreased battery life.

However, when the ionic-electronic conductive compound is used as the positive electrode material in a lithium-air battery, and an organic electrolyte is either not included in the porous positive electrode, or only a portion of the plurality of pores in the porous positive electrode contain the organic electrolyte, it is possible to prevent or reduce chemical deterioration caused by the organic electrolyte, thereby improving the performance of a battery, e.g., increasing a battery life, and reducing manufacturing processes and costs. In addition, by effectively removing the electrolyte from the positive electrode, the manufacturing process and cost of the lithium-air battery may be effectively reduced.

Figure 4:
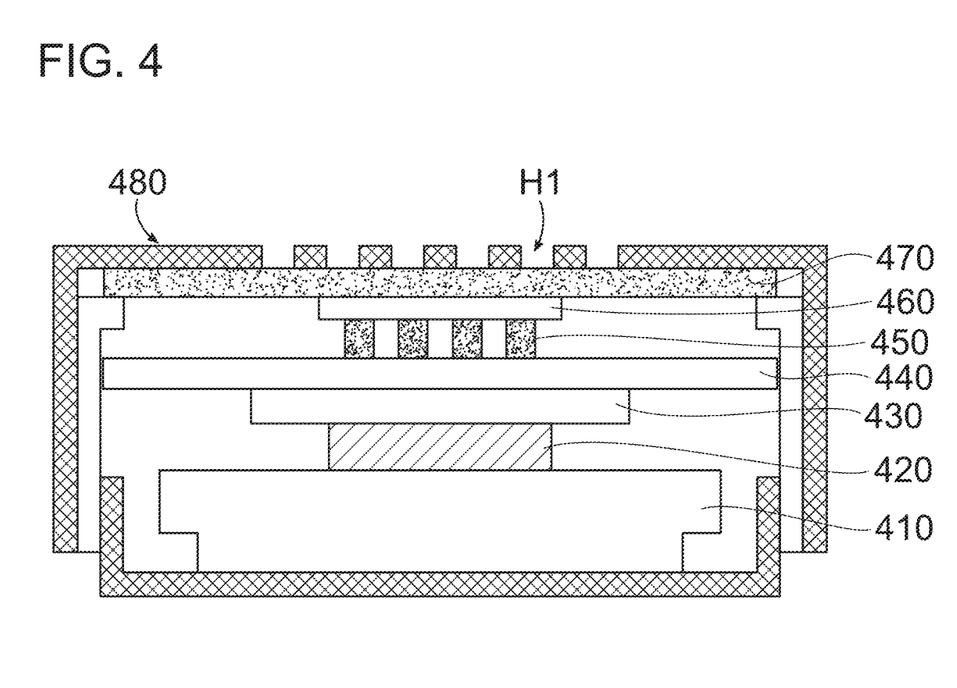
FIG. 4 is a is a cross-sectional view showing a configuration of yet another embodiment of a lithium-air battery.

An example of a lithium-air battery having a coin-cell structure is shown in FIG. 4. The components of the lithium-air battery may be disposed in a case 480 having a plurality of openings H1. A support structure 410 may be disposed on a lower surface of the case 480. The support structure 410 may include, for example, a spacer and a spring member. A negative electrode 420 including a metal may be disposed on the support structure 410. A reaction inhibition layer 430 and a separator 440 may be sequentially disposed on the negative electrode 420. The reaction inhibition layer 430 may be disposed between the negative electrode 420 and the separator 440 and may function to inhibit/prevent a reaction between the negative electrode 420 and the separator 440. The reaction inhibition layer 430 may have a function for conducting ions. A positive electrode 450 may be disposed on the separator 440. The positive electrode 450 may include a hybrid conductive material, that is, a material capable of conducting both electrons and ions. The positive electrode 450 may be a porous positive electrode including a plurality of pores. An electroconductive material layer 460 (e.g., a conductive layer) may be disposed on the positive electrode 450. A gas diffusion layer 470 may be disposed on the conductive layer 460. The gas diffusion layer 470 may be disposed adjacent to the plurality of openings H1 and supplies air from the outside to the positive electrode 450.

The negative electrode 420 of the lithium-air battery may include lithium. The separator 440 may include a solid electrolyte, e.g., lithium aluminum titanium phosphate (LATP). The LATP may be represented by $Li_{1+x}Al_xTi_{2-x}(PO_4)_3$, wherein x may be $0 \le x \le 0.6$, $0.1 \le x \le 0.5$, or $0.15 \le x \le 0.3$. The positive electrode 450 may include the compound of Formula 1 as the ionic-electronic conductive material. The conductive layer 460 may include gold (Au).

The lithium-air battery may include an ionic-electronic conductive compound capable of conducting both electrons and ions as a positive electrode material, thereby preventing or reducing chemical deterioration caused by reaction of an organic electrolyte to form a superoxide ($O_2^-$) or a peroxide ($O^{2-}_2$). Therefore, with the ionic-electronic conductive compound it is possible to improve the performance of a lithium-air battery, increase the battery life, and reduce the manufacturing process steps and overall cost. The lithium-air battery may be applied as a power supply in various types of electronic devices. The lithium-air battery according to the present embodiment may be usefully applied in all fields in which a secondary battery is applied.

This disclosure is further illustrated by the following examples, which are non-limiting.

EXAMPLES

Examples 1-3

The compounds $Li_{0.1}Ba_{0.8}BiO_3$ (Example 1), $Li_{0.2}Ba_{0.6}BiO_3$ (Example 2), and $Li_{0.25}Ba_{0.5}BiO_3$ (Example 3) were prepared by combining stoichiometric amounts of $Li_2CO_3$, $BaCO_3$, $Bi_2O_3$ and ball-milling the mixture for 6 hours (h) with a planetary ball mixer at a speed of 280 rotations per minute (rpm). Following the ball-milling, the obtained powders were pressed into pellets. Pellets of $Li_{0.2}Ba_{0.6}BiO_3$ and $Li_{0.25}Ba_{0.5}BiO_3$ were calcined at 650° C. for 12 hours (h) and pellets of $Li_{0.1}Ba_{0.8}BiO_3$ were calcined at 750 for 12 h. The samples were then ball-milled again for 6 h with a planetary ball mixer at a speed of 280 rpm and pressed into pellets. The pellets were sintered at 600° C. for 12 hours.

Comparative Example 1

The compound $BaBiO_3$ (BBO) was prepared by combining stoichiometric amounts of $BaCO_3$ and $Bi_2O_3$ and ball-milling for 6 hours (h) with a planetary ball mixer at a speed of 280 rotations per minute (rpm). The obtained powder was pressed into pellets and calcined at 750° C. for 12 h. The samples were then ball-milled again for 6 h with a planetary ball mixer at a speed of 280 rpm and pressed into pellets, following by sintering at 750° C. for 12 h.

Comparative Example 2

The compound $Li_{0.34}La_{0.55}TiO_3$ (LLTO) was prepared by combining stoichiometric amounts of $Li_2CO_3$, $La_2O_3$, and $TiO_2$ and ball-milling for 4 hours (h) with a planetary ball mixer at a speed of 280 rotations per minute (rpm). The obtained powder was pressed into pellets and calcined at 1,100° C. for 4 h. The obtained pellet was then ball-milled again for 4 h with a planetary ball mixer at a speed of 280 rpm and pressed into pellets, following by sintering at 1,100° C. for 24 h.

X-Ray Diffraction

Figure 5:
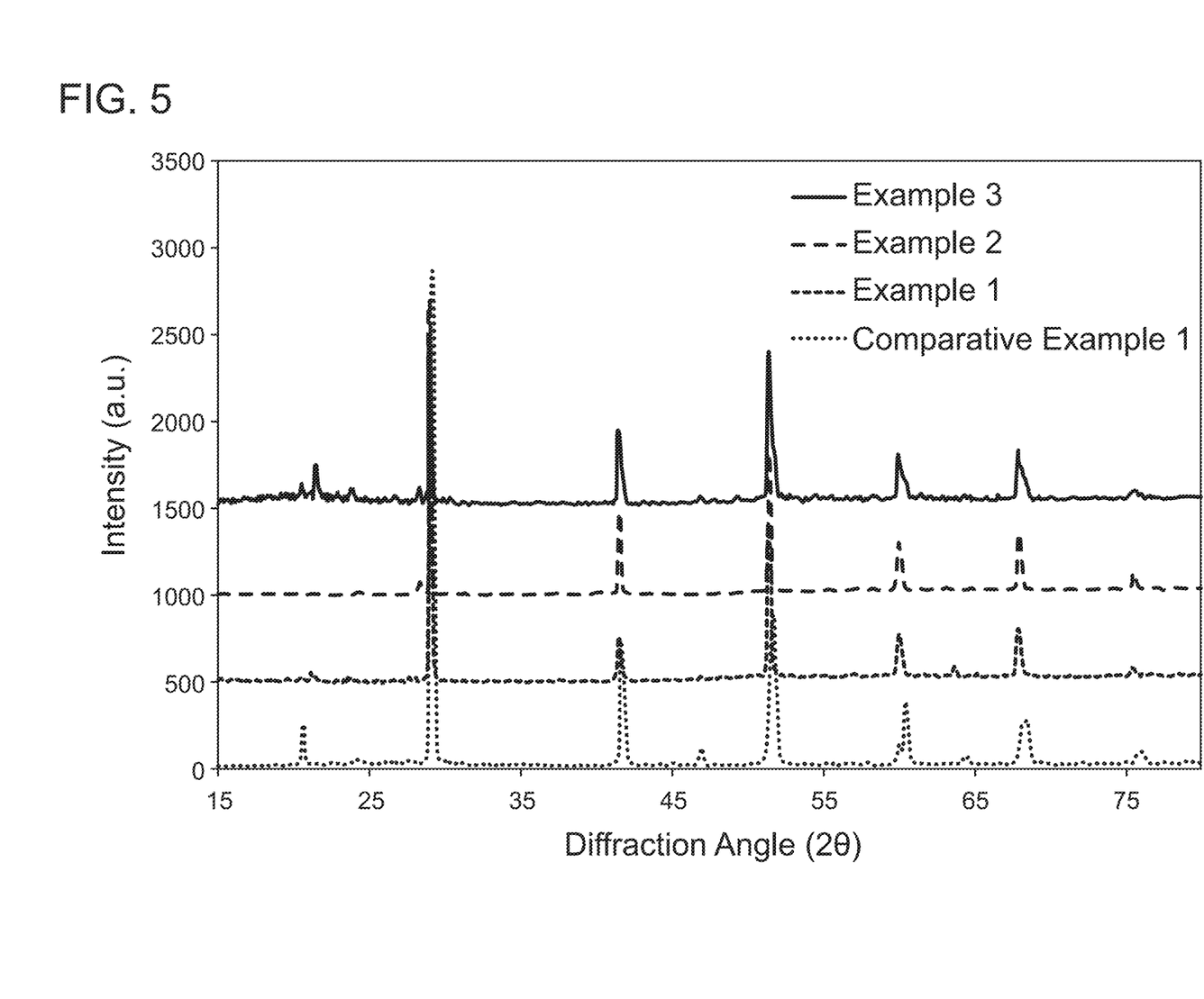
FIG. 5 is a graph of intensity (arbitrary units, a.u.) versus diffraction angle (degrees 2-theta, 2Θ), showing the results of X-ray powder diffraction (XRD) analysis of Examples 1-3 and Comparative Example 1.
Figure 6:
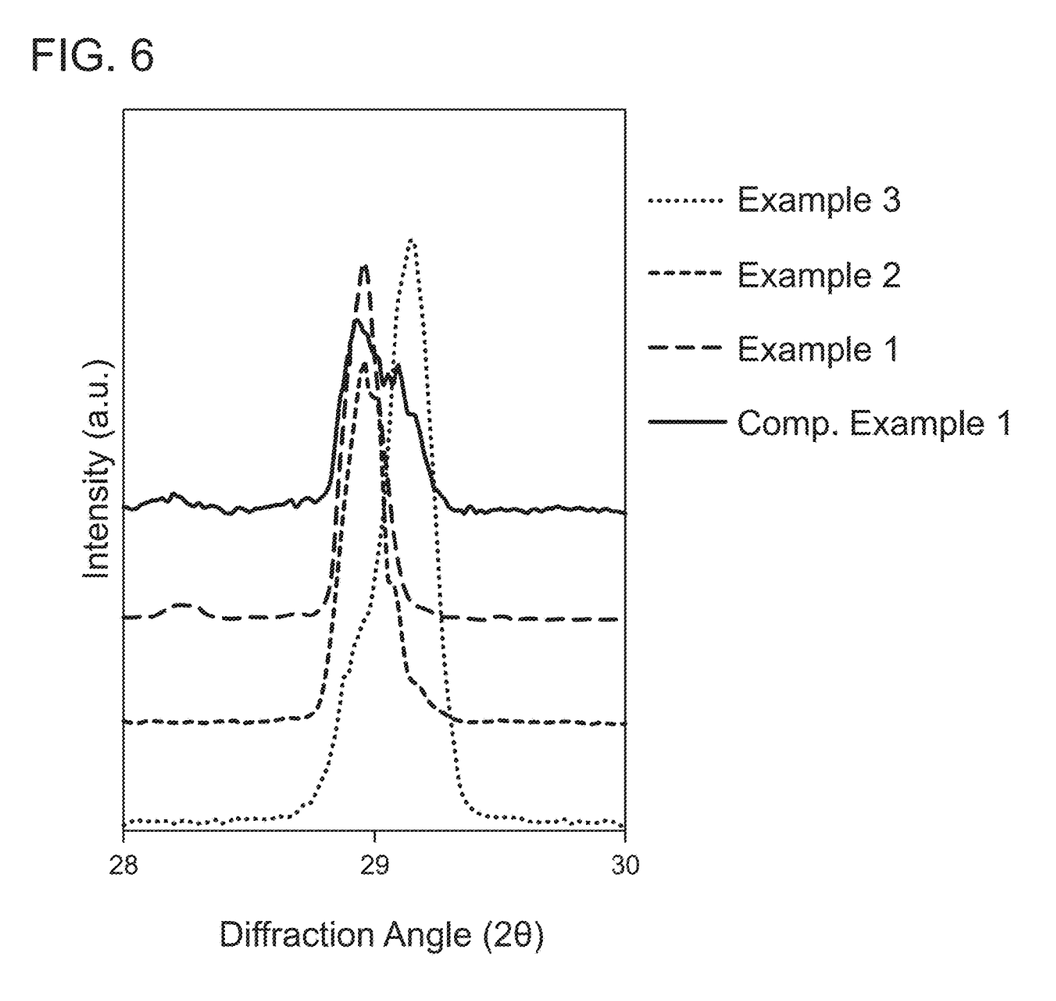
FIG. 6 is an expanded view of a portion of the graph in FIG. 5.

The $Li_{0.1}Ba_{0.8}BiO_3$, $Li_{0.2}Ba_{0.6}BiO_3$, $Li_{0.25}Ba_{0.5}BiO_3$ and $BaBiO_3$ of Examples 1-3 and the $BaBiO_3$ of Comparative Example 1 were analyzed by X-ray diffraction X-ray powder diffraction using CuKα radiation. The results are shown in FIGS. 5 and 6, which show that the $Li_{0.1}Ba_{0.8}BiO_3$, $Li_{0.2}Ba_{0.6}BiO_3$, $Li_{0.25}Ba_{0.5}BiO_3$ and $BaBiO_3$ of Examples 1-3 and Comparative Example 1 are single phase to the detection limit of X-ray powder diffraction. Diffraction peaks at 29.0°, 41.5°, and 51.2° 2θ were observed.

Ionic and Electronic Conductivity

The ionic conductivity of the Examples and Comparative Examples was measured using a blocking cell in a direct current (DC) polarization method. The blocking cell used a Li metal electrode, and an electrolyte comprising 1 molar (M) LiTFSI in propylene carbonate (PC). The blocking cell have the following configuration: Li/Electrolyte/sample pellet/Electrolyte/Li. A constant DC potential of 0.1 volt (V) was applied across the blocking cell and the conductivity was measured. A summary of the data is provided in Table 1.

The ionic conductivity of the Examples and Comparative Examples was measured using similar blocking cell in a DC polarization method, except that gold (Au) electrodes were used instead of the lithium electrodes. A constant DC potential of 0.1 volt (V) was applied across the Li-ion blocking cell and the conductivity was measured. A summary of the data is provided in Table 1 below.

Table 1 below compares the ionic conductivity and the electronic conductivity for each of $Li_{0.1}Ba_{0.8}BiO_3$ (Example 1), $Li_{0.2}Ba_{0.6}BiO_3$ (Example 2), $Li_{0.25}Ba_{0.5}BiO_3$ (Example 3), $BaBiO_3$ (Comparative Example 1) and $Li_{0.34}La_{0.55}TiO_3$ (LLTO) (Comparative Example 2). As shown in Table 1, the ionic conductivity of the disclosed lithium barium bismuth oxide increases to $10^{-6}$ S/cm by the substitution of 0.2 moles of Li in $BaBiO_3$, which is ionic insulator. Electronic conductivity of $Li_{0.2}Ba_{0.6}BiO_3$ at 60° C. is $1.59 \times 10^{-6}$ S/cm.

TABLE 1

| Composition | Electronic Conductivity (S/cm) | | Ionic Conductivity (S/cm) | Calcination Temperature (° C.) | Sintering Temperature (° C.) |
| --- | --- | --- | --- | --- | --- |
| | 60° C. | 20° C. | | | |
| Example 1 $Li_{0.1}Ba_{0.8}BiO_3$ | $1.14 \times 10^{-5}$ | $2.05 \times 10^{-6}$ | $2.96 \times 10^{-8}$ | 750° C. | 600° C. |

TABLE 1-continued

| Composition | Electronic Conductivity (S/cm) 60° C. | Electronic Conductivity (S/cm) 20° C. | Ionic Conductivity (S/cm) | Calcination Temperature (° C.) | Sintering Temperature (° C.) |
|---|---|---|---|---|---|
| Example 2 $Li_{0.2}Ba_{0.6}BiO_3$ | $1.59 \times 10^{-6}$ | $5.52 \times 10^{-7}$ | $4.87 \times 10^{-6}$ | 650° C. | 600° C. |
| Example 3 $Li_{0.25}Ba_{0.5}BiO_3$ | $7.57 \times 10^{-8}$ | $2.21 \times 10^{-8}$ | $3.33 \times 10^{-6}$ | 650° C. | 600° C. |
| Comparative Example 1 $BaBiO_3$ | $6.83 \times 10^{-5}$ | $1.73 \times 10^{-6}$ | — | 750° C. | 750° C. |
| Comparative Example 2 LLTO | — | — | $1.2 \times 10^{-5}$ | 1100° C. | 1100° C. |

Figure 7:
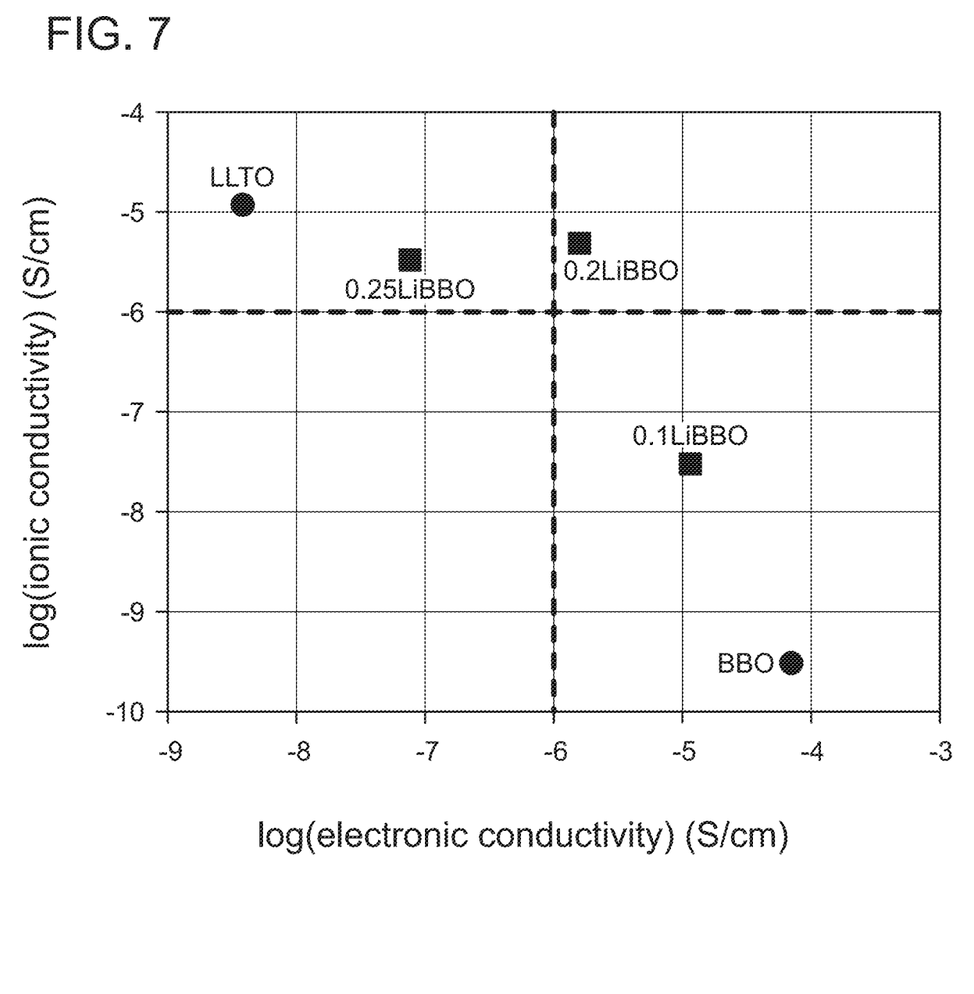
FIG. 7 is a graph of log(ionic conductivity) (Siemens per centimeter, S/cm) versus log(electrical conductivity) (S/cm) comparing the ionic and electronic conductivity of each of Examples 1-3 and Comparative Examples 1-2.

FIG. 7 is a graph comparing the ionic conductivity with the electronic conductivity of for each of Examples 1-3 and Comparative Examples 1-2. As shown in FIG. 7, the $Li_{0.2}Ba_{0.6}BiO_3$ material of Example 2 has an improved combination of both ionic and electronic conductivity among $Li_{0.1}Ba_{0.8}BiO_3$, $Li_{0.2}Ba_{0.6}BiO_3$, $Li_{0.25}Ba_{0.5}BiO_3$, $BaBiO_3$ and LLTO.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A positive electrode for a lithium-air battery, the positive electrode comprising:
an ionic-electronic conductive compound of Formula 1:

$$Li_xA_{(1-x-y)}M_zM'_{(1-z)}O_3 \qquad (1)$$

wherein,
$0<x\leq0.5$, $0.1\leq y\leq0.25$, $0\leq z\leq0.5$,
A comprises Mg, Ca, Sr, Ba, or a combination thereof,
M and M' each independently comprise As, Sb, Bi, or a combination thereof,
wherein y is a vacancy content on an A site of the compound,
wherein the compound has an electronic conductivity of greater than $2\times10^{-8}$ Siemens per centimeter at 20° C., and
an ionic conductivity of greater than $5\times10^{-8}$ Siemens per centimeter at 20° C.

2. The positive electrode of claim 1, wherein in Formula 1, $0.1\leq x\leq0.25$.

3. The positive electrode of claim 1, wherein in Formula 1, A is Ba.

4. The positive electrode of claim 1, wherein the compound has a perovskite-type structure.

5. The positive electrode of claim 1, wherein the ionic-electronic conductive compound has an electronic conductivity of $2\times10^{-8}$ to $2\times10^{-6}$ Siemens per centimeter at 20° C., and having an ionic conductivity of $3\times10^{-8}$ to $3\times10^{-6}$ Siemens per centimeter at 20° C.

6. The positive electrode of claim 1, wherein the ionic-electronic conductive compound has an electronic conductivity of $8\times10^{-8}$ to $1\times10^{-5}$ Siemens per centimeter at 60° C.

7. The positive electrode of claim 1, wherein the ionic-electronic conductive compound has diffraction peaks at 29.0°, 41.5°, and 51.2° 2θ, when analyzed by X-ray powder diffraction using CuKα radiation.

8. A lithium-air battery comprising:
a negative electrode;
a separator; and
the positive electrode of claim 1.

9. A method of manufacturing a positive electrode for a lithium-air battery, the method comprising:
contacting
a compound comprising Li,
a compound comprising Mg, Ca, Sr, Ba, or a combination thereof, and
a compound comprising As, Sb, Bi, or a combination thereof to form a mixture; and
heat-treating the mixture to form an ionic-electronic conductive compound of Formula 1

$$Li_xA_{(1-x-y)}M_zM'_{(1-z)}O_3 \qquad (1)$$

wherein,
$0<x\leq0.5$, $0.1\leq y\leq0.25$, $0\leq z\leq0.5$,
A comprises Mg, Ca, Sr, Ba, or a combination thereof,
M and M' each independently comprise As, Sb, Bi, or a combination thereof,
wherein y is a vacancy content on an A site of the compound,
wherein the compound has an electronic conductivity of greater than $2\times10^{-8}$ Siemens per centimeter at 20° C., and
an ionic conductivity of greater than $5\times10^{-8}$ Siemens per centimeter at 20° C. to manufacture the positive electrode.

10. The method of claim 9, wherein the heat-treating is at a temperature of less than 800° C.

11. The method of claim 9, wherein the heat-treating is at a temperature of 600° C. to 800° C.

12. The method of claim 11, wherein the heat-treating comprises
calcining at a temperature of 650° C. to 750° C., and
sintering at a temperature of 600° C. to 800° C.

13. The positive electrode of claim 1, further comprising a separator, wherein the ionic-electronic conductive compound is on the separator.

14. The positive electrode of claim 1, further comprising a gas diffusion layer, wherein the ionic-electronic conductive compound is on the gas diffusion layer.

15. The positive electrode of claim 1, further comprising a gas diffusion layer, wherein the ionic-electronic conductive compound is between the separator and the gas diffusion layer.

16. The positive electrode of claim 1, further comprising $Li_2O_2$ on the positive electrode.

17. The method of claim 9, further comprising disposing the ionic-electronic conductive compound on a gas diffusion layer on a separator.

\* \* \* \* \*